(12) United States Patent
Ku et al.

(10) Patent No.: US 11,323,909 B2
(45) Date of Patent: May 3, 2022

(54) METHOD AND DEVICE FOR PERFORMING SEQUENTIAL BEAM REPORT PROCEDURE FOR MULTIPLE BEAMS IN WIRELESS COMMUNICATION SYSTEM

(71) Applicant: LG ELECTRONICS INC., Seoul (KR)

(72) Inventors: Gwanmo Ku, Seoul (KR); Sangwook Han, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 91 days.

(21) Appl. No.: 16/960,852

(22) PCT Filed: Jan. 8, 2018

(86) PCT No.: PCT/KR2018/000353
§ 371 (c)(1),
(2) Date: Jul. 8, 2020

(87) PCT Pub. No.: WO2019/135431
PCT Pub. Date: Jul. 11, 2019

(65) Prior Publication Data
US 2020/0336196 A1    Oct. 22, 2020

(51) Int. Cl.
*H04B 7/0408*       (2017.01)
*H04B 7/06*         (2006.01)
(Continued)

(52) U.S. Cl.
CPC .......... *H04W 24/10* (2013.01); *H04B 7/0408* (2013.01); *H04B 7/0617* (2013.01);
(Continued)

(58) Field of Classification Search
CPC .. H04B 7/02–12; H04B 17/0082–3913; H04B 5/003–0098; H04B 8/22–245;
(Continued)

(56) References Cited

FOREIGN PATENT DOCUMENTS

| KR | 20160052657 | 5/2016 |
|----|-------------|--------|
| KR | 20170070225 | 6/2017 |
| WO | 2017217898  | 12/2017 |

OTHER PUBLICATIONS

PCT International Application No. PCT/KR2018/000353, Written Opinion of the International Searching Authority, dated Sep. 13, 2018, 16 pages.

(Continued)

*Primary Examiner* — Timothy J Weidner
(74) *Attorney, Agent, or Firm* — Lee Hong Degerman Kang & Waimey

(57) ABSTRACT

An embodiment of the present specification may provide a method for performing a sequential beam report procedure for multiple beams by a terminal in a wireless communication system. More particularly, the method comprises the steps of: receiving information for a sequential beam report procedure from a base station; measuring, using a signal received from the base station, downlink qualities of multiple beams serviced by the base station; encoding, in descending order, downlink quality measurement results of best M beams among the multiple beams, the downlink qualities of which have been measured; and transmitting the encoded information to the base station so as to perform the sequential beam report procedure.

10 Claims, 16 Drawing Sheets

(51) Int. Cl.
  *H04B 7/08* (2006.01)
  *H04B 17/24* (2015.01)
  *H04B 17/26* (2015.01)
  *H04W 24/10* (2009.01)
  *H04W 72/04* (2009.01)
  *H04W 84/04* (2009.01)
  *H04W 88/02* (2009.01)
  *H04W 88/08* (2009.01)
  *H04W 92/02* (2009.01)
  *H04W 92/10* (2009.01)

(52) U.S. Cl.
  CPC ......... *H04B 7/0632* (2013.01); *H04B 7/0695* (2013.01); *H04B 7/088* (2013.01); *H04B 17/24* (2015.01); *H04B 17/26* (2015.01); *H04W 72/046* (2013.01); *H04W 84/042* (2013.01); *H04W 88/02* (2013.01); *H04W 88/08* (2013.01); *H04W 92/02* (2013.01); *H04W 92/10* (2013.01)

(58) Field of Classification Search
  CPC ........... H04W 8/22–245; H04W 16/28; H04W 24/02–10; H04W 36/0005–385; H04W 48/02–20; H04W 72/02–14; H04W 84/005–22; H04W 88/005–12; H04W 92/02; H04W 92/04; H04W 92/10
  See application file for complete search history.

(56) References Cited

OTHER PUBLICATIONS

Nokia et al., "Beam Indication, Measurements and Reporting," 3GPP TSG-RAN WG1 #90bis, R1-1718511, Oct. 2017, 12 pages.
InterDigital, Inc., "Remaining issues on beam management," 3GPP TSG-RAN WG1 #91, R1-1720630, Dec. 2017, 13 pages.

(a) Control-Plane Protocol Stack (b) User-Plane Protocol Stack

Length detection by $[\log_2 \delta_{k,i}]$

1st length : No previous info. → 4bits
1010 → 10

2nd length by $[\log_2 10]$ → 4bits
1001 → 9

3rd length by $[\log_2 9]$ → 4bits
0111 → 7

4th length by $[\log_2 7]$ → 3bits
101 → 5

5th length by $[\log_2 5]$ → 3bits
100 → 4

6th length by $[\log_2 4]$ → 2bits
11 → 3

[10100010111011011...]
Length detection by $\min(\lceil \log_2(\Delta_6+1)\rceil, \lceil \log_2 \Delta_{x,1}\rceil)$
$1^{st}$ length : No previous info. → 4bits
$1010 \to 10 \quad \delta_1 = 10$ $2^{nd}$ length by $\min(\lceil \log_2 8\rceil, \lceil \log_2 10\rceil) \to $ 3bits
$001 \to 1 \quad \to \quad \delta_2 = 10 - 1 = 9$ $3^{rd}$ length by $\min(\lceil \log_2 8\rceil, \lceil \log_2 9\rceil) \to $ 3bits
$011 \to 3 \quad \to \quad \delta_3 = 10 - 3 = 7$ $4^{th}$ length by $\min(\lceil \log_2 8\rceil, \lceil \log_2 7\rceil) \to $ 3bits
$101 \to 5 \quad \to \quad \delta_4 = 10 - 5 = 5$ $5^{th}$ length by $\min(\lceil \log_2 8\rceil, \lceil \log_2 5\rceil) \to $ 3bits
$110 \to 5 \quad \to \quad \delta_5 = 10 - 6 = 4$ $6^{th}$ length by $\min(\lceil \log_2 8\rceil, \lceil \log_2 4\rceil) \to $ 2bits
$11 \to 3 \quad \to \quad \delta_6 = 3$
(because this value is the last reporting value and has length shorter than $\Delta_6+1$)

Length detection by $\min(\lceil\log_2(A_{max}+1)\rceil,\lceil\log_2\delta_{k-1}\rceil)$ $1^{st}$ length : No previous info. → 4bits $1010 \to 10 \quad \delta_1 = 10$     [10100110100101...]

$2^{nd}$ length by $\min(\lceil\log_2 3\rceil,\lceil\log_2 10\rceil) \to$ 2bits $01 \to 1 \quad\to\quad \delta_2 = 10 - 1 = 9$     [10100110100101...]

$3^{rd}$ length by $\min(\lceil\log_2 3\rceil,\lceil\log_2 9\rceil) \to$ 2bits $10 \to 2 \quad\to\quad \delta_3 = 9 - 2 = 7$     [10100110100101...]

$4^{th}$ length by $\min(\lceil\log_2 3\rceil,\lceil\log_2 7\rceil) \to$ 2bits $10 \to 2 \quad\to\quad \delta_4 = 7 - 2 = 5$     [10100110100101...]

$5^{th}$ length by $\min(\lceil\log_2 3\rceil,\lceil\log_2 5\rceil) \to$ 2bits $01 \to 1 \quad\to\quad \delta_5 = 5 - 1 = 4$     [10100110100101...]

$6^{th}$ length by $\min(\lceil\log_2 3\rceil,\lceil\log_2 4\rceil) \to$ 2bits $01 \to 1 \quad\to\quad \delta_6 = 4 - 1 = 3$     [10100110100101...]

METHOD AND DEVICE FOR PERFORMING SEQUENTIAL BEAM REPORT PROCEDURE FOR MULTIPLE BEAMS IN WIRELESS COMMUNICATION SYSTEM

CROSS-REFERENCE TO RELATED APPLICATIONS

This application is the National Stage filing under 35 U.S.C. 371 of International Application No. PCT/KR2018/000353, filed on Jan. 8, 2018, the contents of which are all hereby incorporated by reference herein in their entirety.

TECHNICAL FIELD

The present disclosure relates to a wireless communication system and, more particularly, to a method for performing a sequential beam reporting procedure of multiple beams in wireless communication system and a device therefor.

BACKGROUND ART

As an example of a mobile communication system to which the present disclosure is applicable, a 3rd Generation Partnership Project Long Term Evolution (hereinafter, referred to as LTE) communication system is described in brief.

Pi FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DETAILED DESCRIPTION OF THE DISCLOSURE

Technical Problems

The present disclosure includes a sequential encoding method for a reporting procedure for M best beams in a 5G new radio (NR) system in which a plurality of beams is considered. The present disclosure relates to a new beam reporting mechanism considering the directionality and correlation of beams in order to secure received coverage of a UE/eNB since multiple beams applied to the NR system show a stronger beam correlation than waves used in a legacy system.

The objects to be achieved with the present disclosure are not limited to what has been particularly described hereinabove and other objects not described herein will be more clearly understood by persons skilled in the art from the following detailed description.

Technical Solutions

The objects of the present disclosure are achievable by providing an operation method of a UE in a wireless communication system as claimed in the claims.

According to another aspect of the present disclosure, a communication device as claimed in the claims is provided.

Both the foregoing general description and the following detailed description of the present disclosure are exemplary and explanatory and are intended to provide further explanation of the present disclosure as claimed.

Advantageous Effects

According to the present disclosure, measurement reporting overhead may be effectively reduced.

According to the present disclosure, an encoding technique of various lengths may be considered, without a restriction condition of a container size, rather than considering only a situation in which the size of a container transmitting information is fixed as in a conventional feedback method.

The effects that are achievable with the present disclosure are not limited to what has been particularly described hereinabove and other advantages not described herein will be more clearly understood by persons skilled in the art from the following detailed description of the present disclosure.

DESCRIPTION OF DRAWINGS

The accompanying drawings, which are included to provide a further understanding of the disclosure, illustrate embodiments of the disclosure and together with the detailed description serve to explain the principle of the disclosure.

FIG. 18A illustrates decoding of gNB on encoded information received from UE in the case of Embodiment 1-1 of the present disclosure.

FIG. 18B illustrates decoding of gNB on encoded information received from UE in the case of Embodiment 1-2 of the present disclosure.

FIG. 18C illustrates decoding of gNB on encoded information received from UE in the case of Embodiment 1-3 of the present disclosure.

BEST MODE FOR CARRYING OUT THE DISCLOSURE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present disclosure will be readily understood from the embodiments of the present disclosure, examples of which are illustrated in the accompanying drawings. Embodiments described later are examples in which technical features of the present disclosure are applied to a 3GPP system.

Although the embodiments of the present disclosure are described in the context of a long term evolution (LTE) system and a LTE-advanced (LTE-A) system in the present specification, they are purely exemplary. Therefore, the embodiments of the present disclosure are applicable to any other communication system corresponding to the above definition. An exemplary system in which the disclosure disclosed herein may be implemented is a system compliant with the 3GPP specification TS 36.321 Version 12.6.0. In addition, although the embodiments of the present disclosure are described based on a frequency division duplex (FDD) scheme in the present specification, the embodiments of the present disclosure may be easily modified and applied to a half-duplex FDD (H-FDD) scheme or a time division duplex (TDD) scheme.

Figure 1:
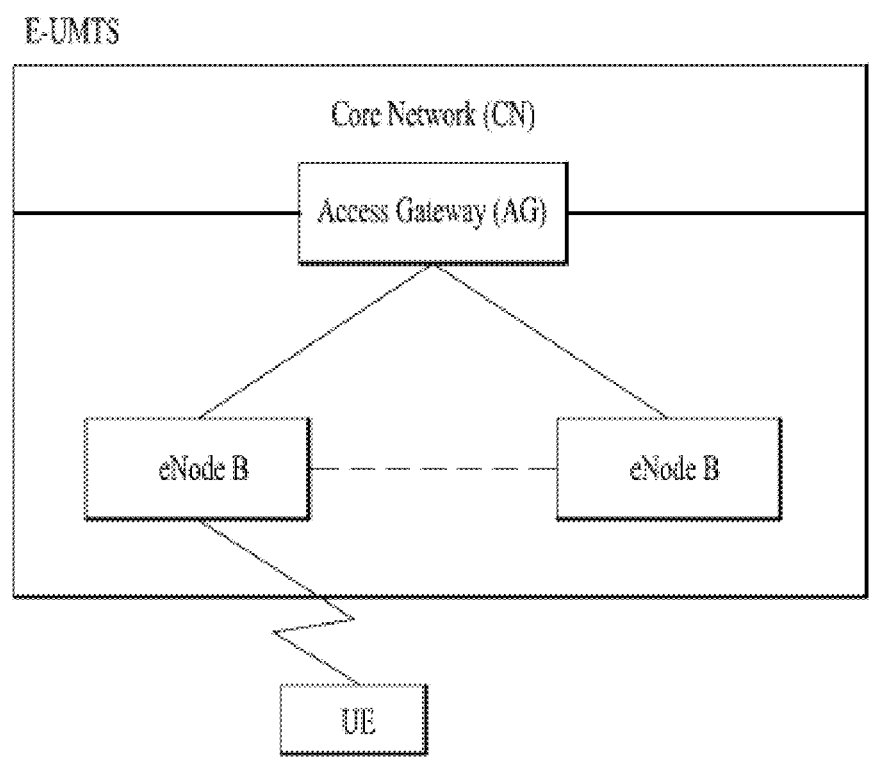
FIG. 1 is a diagram showing a network structure of an Evolved Universal Mobile Telecommunications System (E-UMTS) as an example of a wireless communication system.
Figure 2A:
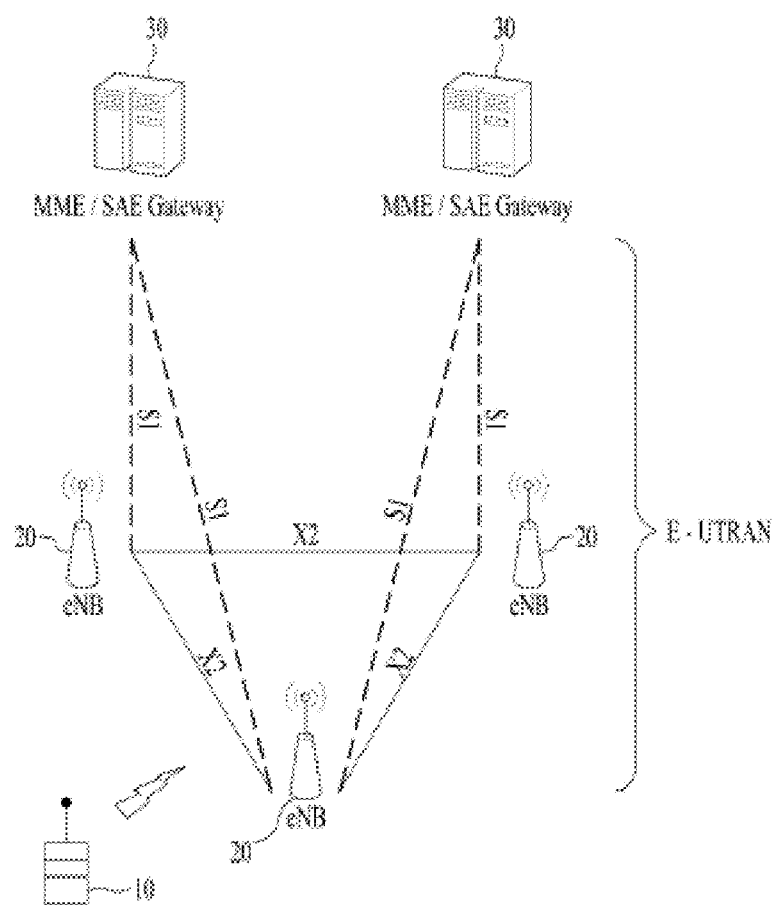
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
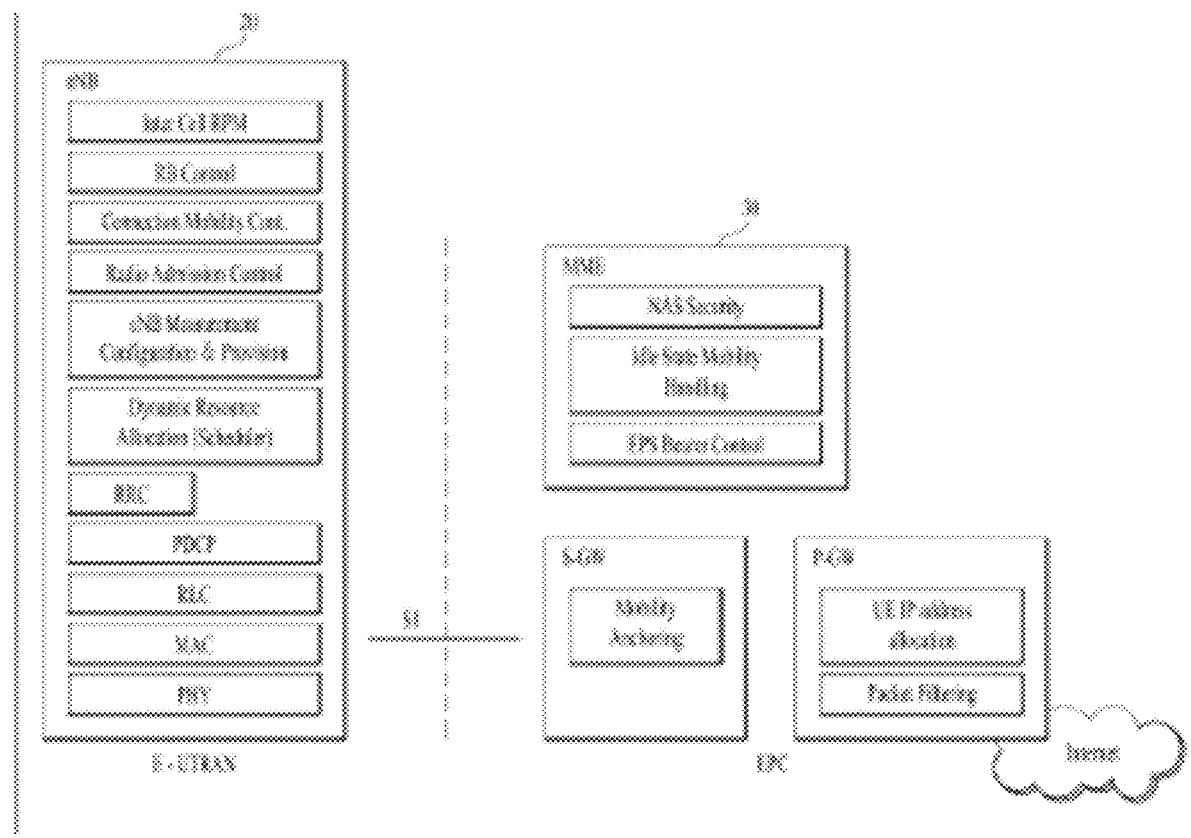
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
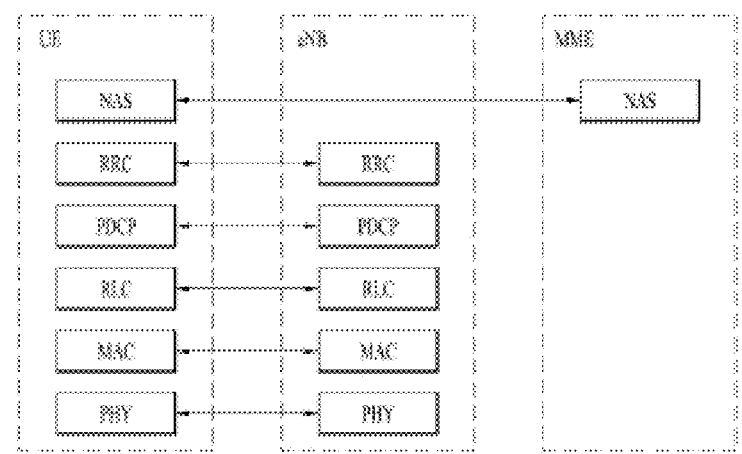
FIG. 3 is a diagram showing a control plane and a user plane of a radio interface protocol between a UE and an E-UTRAN based on a 3rd generation partnership project (3GPP) radio access network standard.
Figure 3:
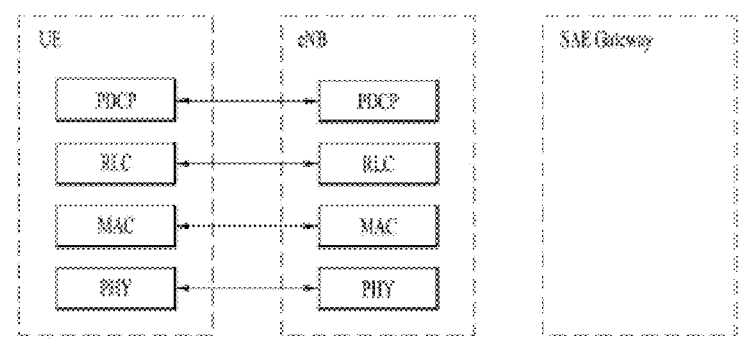

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
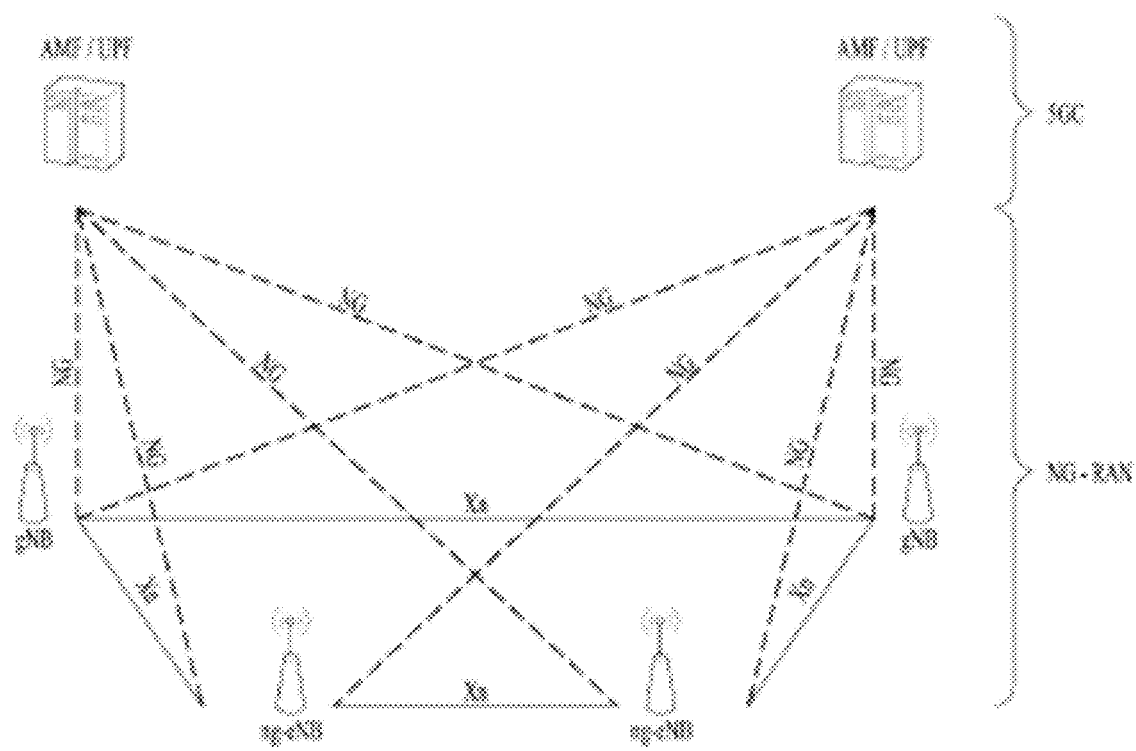
FIG. 4A is a block diagram illustrating a network structure of a next-generation radio access network (NG-RAN)
Figure 4B:
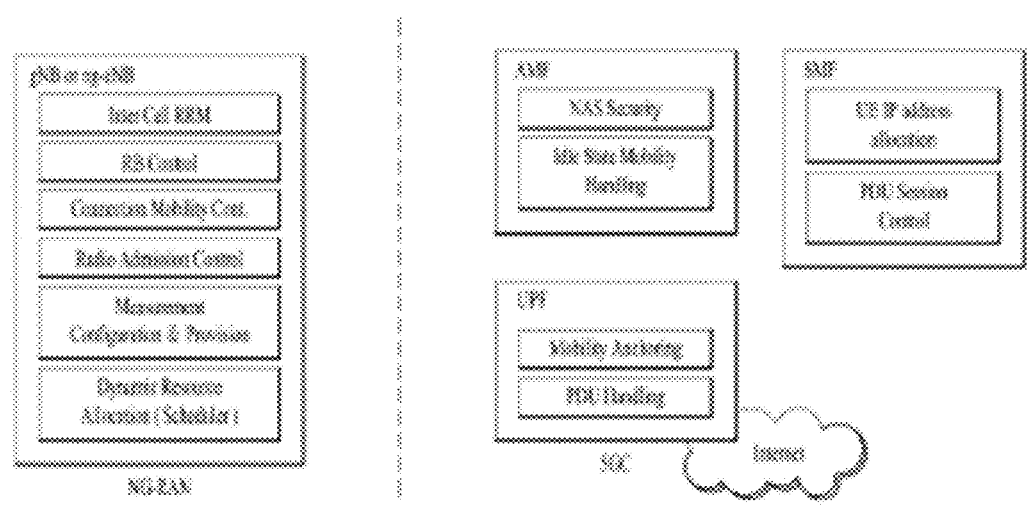
FIG. 4B is a block diagram illustrating architecture of a typical NG-RAN and a typical 5G core network (5GC).

FIG. 4A is a block diagram illustrating a network structure of a next-generation radio access network (NG-RAN), and FIG. 4B is a block diagram illustrating architecture of a typical NG-RAN and a typical 5G core network (5GC).

3GPP defines both LTE and new radio (NR) as 5G radio access technology. NR, which is 5G new radio access technology, may be connected to an EPC, which is a legacy 4G core network, and then used. In this case, the name of an NR transport network is an E-UTRAN, which is the same as in legacy LTE.

An NG-RAN node is a gNB that provides NR user plane and control plane protocol terminations towards the UE or an ng-eNB that provides E-UTRA user plane and control plane protocol terminations towards the UE.

The gNB and the ng-eNB are interconnected by means of an Xn interface. The gNB and the ng-eNB are also connected by means of NG interfaces to a 5GC. More specifically, the gNB and the ng-eNB are connected to an access and mobility management function (AMF) by means of NG-C interfaces and to a user plane function (UPF) by means of NG-U interfaces.

The Xn Interface includes an Xn user plane (Xn-U) interface and an Xn control plane (Xn-C) interface.

The Xn-U interface is defined between two NG-RAN nodes. A transport network layer is built on Internet protocol (IP) transport and GTP-U is used on top of user datagram protocol (UDP)/IP to carry user plane protocol data units (PDUs). The Xn-U interface provides non-guaranteed delivery of user plane PDUs and supports the functions of data forwarding and flow control.

The Xn-C interface is defined between two NG-RAN nodes. The transport network layer is built on stream control transmission protocol (SCTP) on top of IP. Application layer signaling protocol is referred to as an Xn application protocol (XnAP). The SCTP layer provides the guaranteed delivery of application program layer messages. In a transport IP layer, point-to-point transmission is used to deliver signaling PDUs. The Xn-C interface supports the functions of: i) Xn interface management, ii) UE mobility management, including context transfer and RAN paging, and iii) dual connectivity.

The NG Interface includes an NG user plane (NG-U) interface and an NG control plane (NG-C) interface. The NG-U interface is defined between the NG-RAN node and the UPF. The transport network layer is built on IP transport and GTP-U is used on top of UDP/IP to carry user plane PDUs between the NG-RAN node and the UPF. The NG-U interface provides non-guaranteed delivery of user plane PDUs between the NG-RAN node and the UPF.

The NG-C interface is defined between the NG-RAN node and the AMF. The transport network layer is built on IP transport. For the reliable transport of signaling messages, SCTP is added on top of IP. Application layer signaling protocol is referred to as NG application protocol (NGAP). The SCTP layer provides guaranteed delivery of application layer messages. In transport, IP layer point-to-point transmission is used to deliver signaling PDUs. The NG-C interface provides the functions: i) NG interface management; ii) UE context management; iii) UE mobility management; iv) configuration transfer; and v) warning message transmission.

Figure 5:
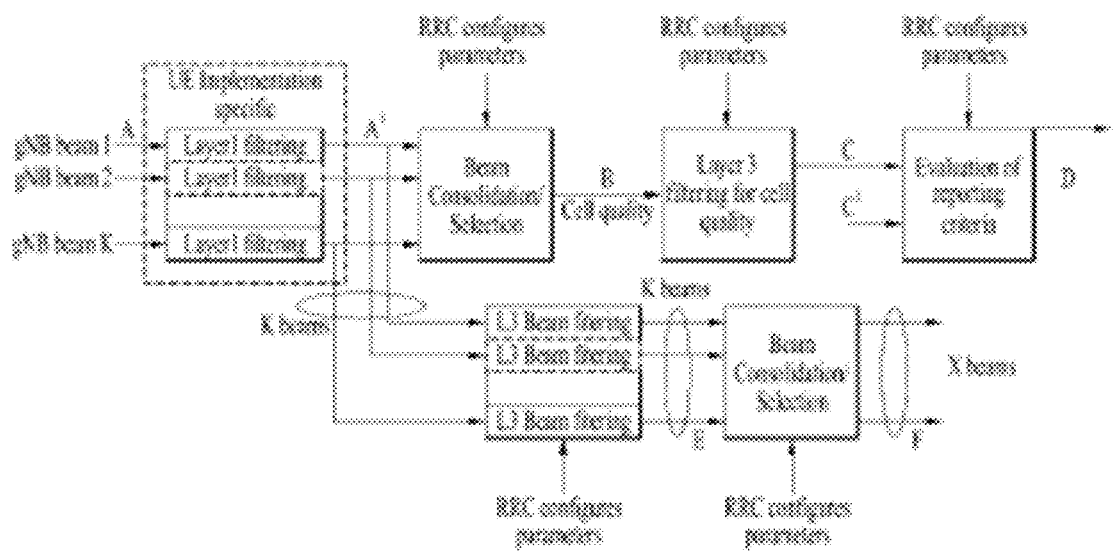
FIG. 5 is a diagram illustrating an exemplary high-level measurement method in NR.

FIG. 5 is a diagram illustrating an exemplary high-level measurement method in NR.

In RRC_CONNECTED, a UE measures multiple beams (at least one beam) of a cell and averages the measurements results (power values) to derive cell quality. In doing so, the UE is configured to consider a subset of detected beams, i.e., N best beams above an absolute threshold. Filtering occurs at two different levels, i.e., at a physical layer to derive beam quality and at an RRC level to derive cell quality from multiple beams. Cell quality from beam measurement is derived in the same way for serving cell(s) and for non-serving cell(s). Measurement reports may contain the measurement results of X best beams if the UE is configured by the gNB.

The measurement reports are characterized in that: i) measurement reporting includes a measurement ID of an associated measurement configuration that has triggered the reporting; ii) cell and beam measurement quantities to be included in the measurement reporting are configured by a network; iii) the number of serving cells not to be reported may be limited through configuration by the network; iv) cells belonging to a blacklist configured by the network are not used in event evaluation and reporting, and conversely when a whitelist is configured by the network, only cells belonging to the whitelist are used in event evaluation and reporting; and v) beam measurement to be included in the measurement reporting is configured by the network (a beam identifier only, a measurement result and beam identifier, or no beam reporting).

Waves used in NR and millimeter wave (mm Wave) systems exhibit narrow beam width in an analog beam end and have characteristics of being received only in a narrow region due to Fresnel effects while the waves are propagated. When multiple beams applied to NR are considered, since the waves show a stronger beam correlation than waves used in a legacy system, a new beam reporting mechanism considering the directionality and correlation of beams should be considered in order to secure received coverage of the UE/gNB.

The prior art may reduce overhead by considering only differential offsets, without considering correlation, when performing feedback reports for multiple measurements (channel state information (CSI), channel quality indicator (CQI), reference signal received power (RSRP), reference signal received quality (RSRQ), reference signal (RS)-signal to interface-plus-noise ratio (SINR), SINR, etc.). However, there is a disadvantage of not guaranteeing fine resolution for values exceeding an offset range. Therefore, the new beam reporting mechanism considering the directionality and correlation of beams should be considered in order to guarantee accuracy.

Particularly, in a typical communication system considering multiple users, since there is a situation in which multiple users positioned at contiguous locations have similar channel statistics, i.e., correlation, with respect to signals received from the gNB, the correlation may be regarded as an important element for reducing overhead during feedback for a channel situation.

Meanwhile, a conventional feedback method considers only a situation in which the size of a container transmitting information is fixed (to n bits). This is problematic in that variable-length coding methods, which are schemes for most efficiently reducing feedback overhead, are inapplicable. However, only if the length of feedback information transmitted by a reception side can be confirmed, a restriction condition of the container size may be affected. Therefore, even when encoding techniques for various lengths are considered, a mechanism for determining, by the reception side, the container size is needed.

The present disclosure proposes a scheme capable of guaranteeing perfect resolution using a sequential beam reporting procedure considering correlation statistics and a scheme capable of detecting length based on sequential information using a predefined pattern, when multi-beam reporting is considered in the NR and mmWave systems.

Figure 6:
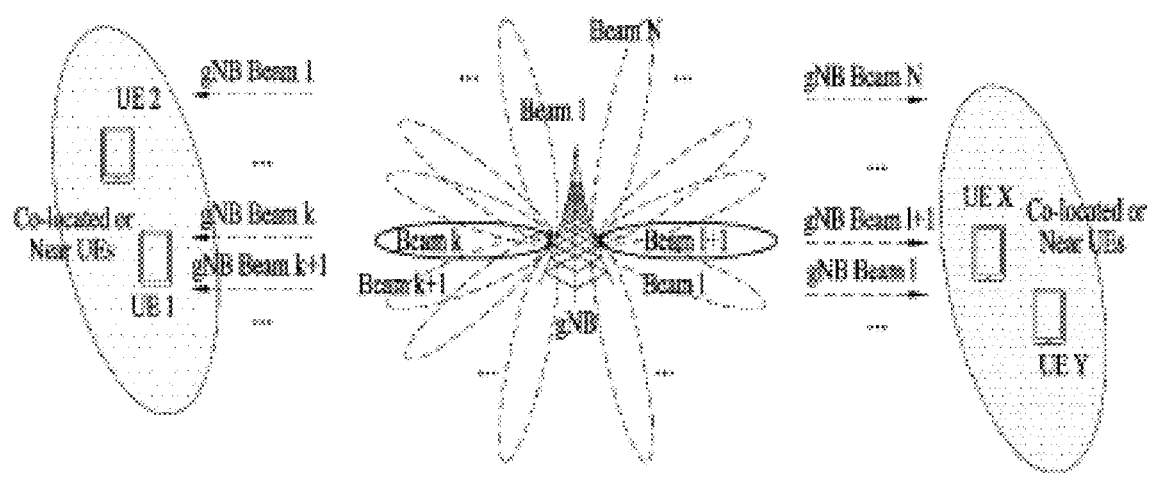
FIG. 6 is a schematic diagram illustrating a sequential beam reporting procedure considering correlation statistics according to an embodiment of the present disclosure.

FIG. 6 is a schematic diagram illustrating a sequential beam reporting procedure considering correlation statistics according to an embodiment of the present disclosure.

In the prior art, when an mmWave based communication system is considered, UEs receive reference signals (RSs) (e.g., beam RSs, CSI-RSs, etc.), which are specified for beam measurement, from the gNB through respective antenna ports and then measure the RSs. Thereafter, the UEs decode the measured RSs to confirm beam IDs preconfigured between the gNB and the UEs and report measurement results of M best beams among N beams.

Typically, in order to report measurement results of M best beams, the UE requires M times single-beam reporting information (number of bits for representing beam IDs+ number of bits for representing a measurement value per beam), where M is the number of transmitted beams.

For example, in NR, 4-best beam reporting using a differential offset among a total of N(=32) beams generates feedback overhead of a total of 33 bits (M×⌈ log$_2$ N⌉+4+(M−1)×3) which are an absolute differential offset of 4 bits+3*3 bits, in which the 4 bits correspond to the best beams.

However, as mentioned in the foregoing problems, since there is correlation between multiple users positioned at contiguous locations, which has similar channel statistics, with respect to signals received from the gNB, this correlation may be regarded as an important element for reducing overhead during feedback for a channel situation.

Figure 8:
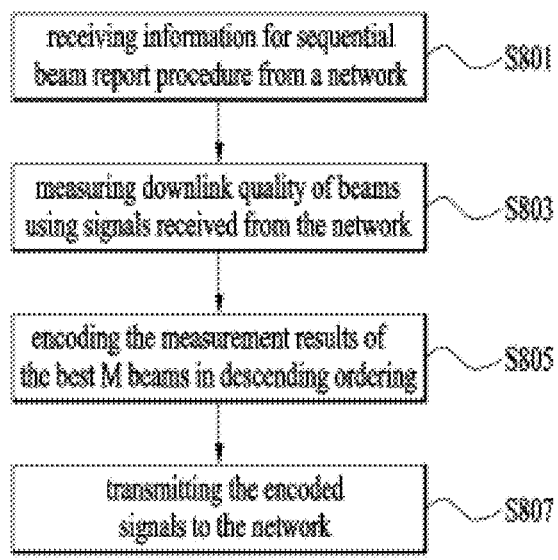
FIG. 8 is a flowchart illustrating a method of performing a sequential beam reporting procedure by a UE in a wireless communication system according to an embodiment of the present disclosure.

A method of transmitting multiple beams considered in mmWave and NR is illustrated in FIG. 8. It is assumed that individual UEs report measurement results of M best beams among a total of N beams transmitted by the gNB. In this case, since it is assumed that correlation between beams in contiguous directions is considered for individual UEs due to wave characteristics having narrow beam widths and that contiguous UEs measure similar channel values, correlation between UEs may be considered when specific beams are determined.

Generally, correlation is defined as a correlation coefficient between random parameters. A correlation coefficient for two given parameters X and Y is defined by Equation 1.

$$\gamma_{X,Y} = \frac{E[(X-\mu_X)(Y-\mu_Y)]}{\sigma_X \sigma_Y} \qquad \text{[Equation 1]}$$

where $\mu_X = E[X]$, $\mu_Y = E[Y]$, $\sigma_X = \sqrt{E[(X-\mu_X)^2]}$, $\sigma_Y = \sqrt{E[(Y-\mu_Y)^2]}$, and $-1 \le \gamma_{X,Y} \le 1$.

The correlation coefficient $\gamma_{X,Y}$ is 0 if the correlation parameters X and Y are independent. If $|\gamma_{X,Y}|=1$, then $Y-\mu_Y = K(X-\mu_X)$.

A general correlation may be represented as in Equation 1. However, the meaning of correlation mainly used in coding is discussed in values of a bit unit or a symbol unit.

For example, bit-level correlation is represented using an error probability p as used in a binary symmetric channel. When a probability that given bits (0 or 1) will have the same value is 1−p and a probability that given bits will have different values is p, a correlation degree may be represented using 1−p. Conditional entropy that should be actually transmitted is $H(Y|X)=H(X|Y)=p \log_2 p+(1-p)\log_2(1-p)=H(p)$, and H(p) of the lowest value implies a high correlation.

Symbol-level correlation is typically represented as how near a symbol is from a determined symbol and indicates a distance of a symbol farthest separated from a measurement symbol. A correlation coefficient γ is determined depending on to which degree measurement values are near to the best beams based on the largest measurement value in terms of report of M best beams.

In the case of an absolute differential offset, a correlation degree is defined as follows.

Strong Correlation($\Delta_M \le L_{strong}$)

Medium Correlation($L_{strong} < \Delta_M \le L_{weak}$)

Weak Correlation($L_{weak} < \Delta_M$)

where '$L_{strong}$' and '$L_{weak}$' are values configured by a system as references for determining the correlation degree.

For example, when reporting for M best beams is considered, a strong correlation is defined using '$L_{strong}$' as a range having values within $p_{strong}$ % based on the best beams, a weak correlation is defined using '$L_{weak}$' as a range of values exceeding $p_{weak}$ %, and a medium correlation is defined as a range between $p_{strong}$ % and $p_{weak}$ %. If there is no correlation, the correlation degree is set to be the same as $\Delta_M$ indicating the difference between a maximum value and a minimum value.

In the case of a relative differential offset, the correlation degree is defined as follows.

Strong Relative Correlation(max($\Delta_2, \ldots, \Delta_M$) $\le L_{strong,rel}$)

Medium Relative Correlation($L_{strong,rel} <$ max ($\Delta_2, \ldots, \Delta_M$) $\le L_{weak,rel}$)

Weak Relative Correlation($L_{weak,rel} <$ max ($\Delta_2, \ldots, \Delta_M$))

where '$L_{strong,rel}$' and '$L_{weak,rel}$' are values configured by the system, similar to the absolute differential offset, as references for determining the correlation degree. For example, when beams are individually calculated as relative levels based on previous best beams in a situation in which reporting for M best beams is considered, a strong relative correlation is defined using '$L_{strong,rel}$' as a range in which $\Delta_M$ has values within $p_{strong,rel}$ %, a weak relative correlation is defined using '$L_{weak,rel}$' as a range in which $\Delta_M$ has values exceeding $p_{weak,rel}$ %, and a medium relative correlation is defined as a range in which $\Delta_M$ is between $p_{strong,rel}$ % and $p_{weak,rel}$ %.

Figure 7:
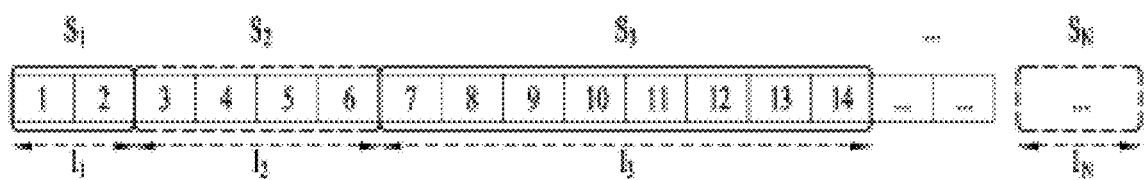
FIG. 7 is a diagram illustrating a general partitioning scheme of disjoint subsets.

FIG. 7 is a diagram illustrating a general partitioning scheme of disjoint subsets.

Figure 9:
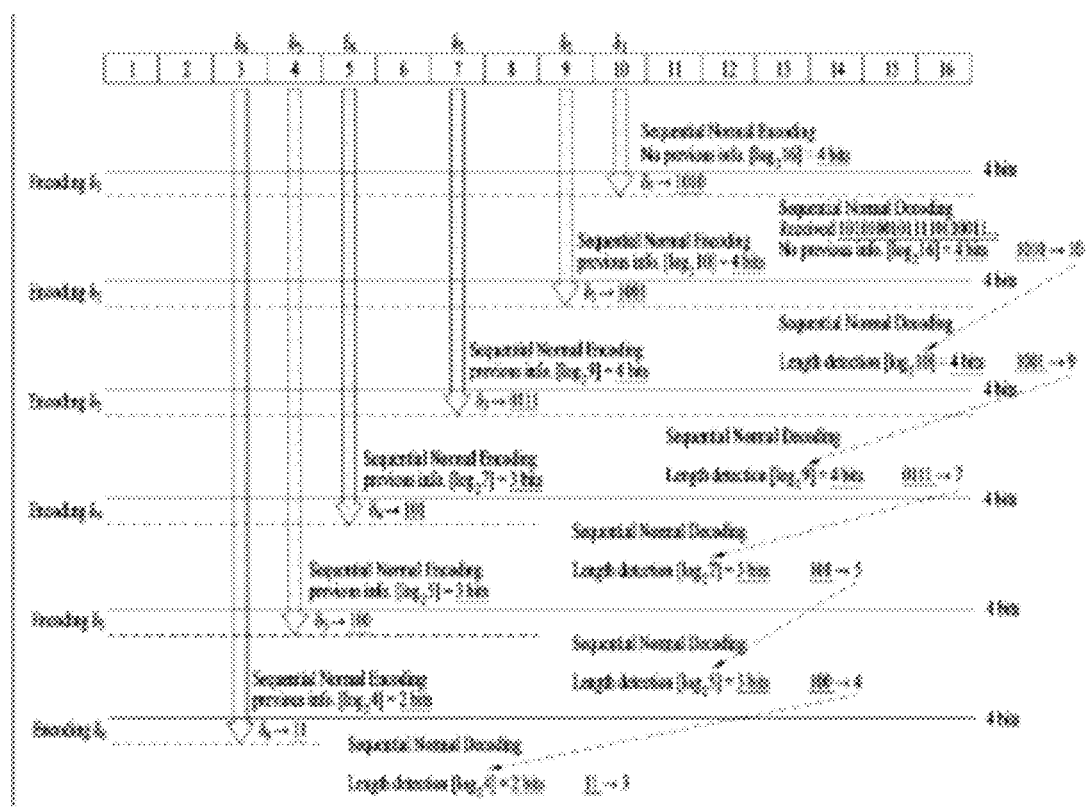
FIG. 9 illustrates a simulation result of overhead reduction for sequential normal reporting to which a correlation coefficient is not applied.

When the reception side is capable of detecting the length of a single measurement value transmitted by the transmission side, overhead may be reduced by applying the general partitioning scheme of disjoint subsets illustrated in FIG. 7. Among total index values (sample space Ω) representing measurement reporting levels, a disjoint partition as illustrated in FIG. 9 is defined.

Assuming that Si is a subset of Ω, the following relationship is satisfied when i≠j $$\bigcup_i S_i = \Omega$$

$$S_i \cap S_j = \emptyset$$

In this case, partitions of Ω may be a set of subsets of mutually exclusive Ω so that the sum of the partitions may be Ω.

When the length of each subset is set to li, Equation 2 is satisfied.

$$l_i \ne l_j \qquad \text{for } i \ne j \qquad \text{[Equation 2]}$$

$$\lceil \log_2 l_i \rceil \ne \lceil \log_2 l_j \rceil \quad \text{for } i \ne j$$

In the case, there is no need to satisfy $l_i \in \{2^1, 2^2, 2^3, \ldots\}$ and these values are determined from information received from the gNB.

In this regard, the UE checks a partition to which a measured reporting value belongs among disjoint subsets. If the measured reporting value corresponds to an i-th partition, the UE represents the location of the measured reporting value using $\lceil \log_2 l_i \rceil$ bits and transmits information about the $\lceil \log_2 l_i \rceil$ bits to the gNB. Upon receiving the information about the $\lceil \log_2 l_i \rceil$ bits from the UE, the gNB distinguishes a corresponding subset through length of the received information. As described above, when i and j differ, since the lengths of i and j differ (refer to Equation 2), the corresponding subset may be distinguished. If the received information indicates an i-th subset, a measurement value may be derived using a value received as $\lceil \log_2 l_i \rceil$ bits.

FIG. 8 is a flowchart illustrating a method of performing a sequential beam reporting procedure by a UE in a wireless communication system according to an embodiment of the present disclosure.

Embodiment 1

When a conventional absolute differential offset or relative differential offset scheme is applied, a desirable result may not be guaranteed with respect to values that exceed a predetermined range or values that are not mapped in one-to-one correspondence at a quantization level. Therefore, the present embodiment introduces a scheme of guaranteeing a desirable result while reducing overhead.

Unlike FIG. 7, when the reception side is incapable of detecting the length of a measurement value transmitted by the transmission side, it is possible to detect the length of the measurement value using sequential information.

To this end, the present disclosure introduces a sequential beam reporting procedure. The sequential beam reporting procedure according to the present disclosure includes a method of determining the length of an encoded symbol through sequential subset partitions by the transmission side and the reception side.

The sequential beam reporting procedure proposed in the present disclosure is triggered by receiving information for the sequential beam reporting procedure from the gNB (S801).

The information for the sequential beam reporting procedure includes a beam reporting type to be reported by the UE, the number, M, of best beams that the UE should report, and a correlation coefficient.

Desirably, the information for the sequential beam reporting procedure may be signaled by the gNB through system information block (SIB) information or a dedicated signal.

The beam reporting type to be reported by the UE may be categorized into 4 types in total. For example, the beam reporting type may be categorized into 00 indicating normal reporting corresponding to the prior art, 01 indicating sequential normal reporting, 10 indicating sequential absolute differential offset reporting, and 11 indicating sequential relative differential offset reporting.

The sequential beam reporting procedure proposed in the present disclosure is based on a report on M best beams by the UE supporting multiple beams. This procedure includes measuring downlink qualities of multiple means serviced by the gNB using a signal received from the gNB and reporting downlink quality measurement results of the M best beams among the multiple beams on which downlink quality measurement is performed.

The number, M, of best beams that the UE should report is based on the report on the M best beams as described above. That is, this means that the number of best beams is preset.

If the sequential beam reporting procedure is triggered by the gNB, the UE measures downlink qualities of multiple beams serviced by the gNB (S803).

Desirably, one of RSRP, RSRQ, CQI, etc. defined in a normal channel quality reporting procedure may be considered as measurement values for the downlink qualities of multiple beams.

The UE encodes the downlink quality measurement results of the M best beams in descending order among the multiple beams on which downlink quality measurement is performed (S805).

The most importance element for reducing overhead in the sequential beam reporting procedure is the correlation coefficient.

The beam reporting type to be reported by the UE includes sequential normal reporting to which the correlation coefficient is not applied, sequential absolute differential offset reporting to which the correlation coefficient is applied, and sequential relative differential offset reporting.

Sequential normal reporting to which the correlation coefficient is not applied may reduce overhead using only sequential information.

As described above, the correlation coefficient is meaningful when multiple users positioned at adjacent locations have similar channel statistics. Therefore, in the case of sequential absolute differential offset reporting and sequential relative differential offset reporting, for reporting the difference between two measurement values, overhead may be reduced by applying both the sequential information and the correlation coefficient.

Desirably, the correlation coefficient includes a strong correlation level $L_{strong}$ or $L_{strong,rel}$ and a weak correlation level $L_{weak}$ or $L_{weak,rel}$.

After step S805, the UE transmits encoded information to the gNB (S807).

If the sequential beam reporting procedure is triggered by the gNB, the UE measures downlink qualities of multiple beams serviced by the gNB using a signal received from the gNB and arranges the measured downlink qualities in descending order.

An embodiment described below considers 4-bit measurement reporting. If the UE performs measurement on a total of N(=16) beams and selects measurement values for M (=6) best reporting targets, different reporting methods are considered according to the following classification criterion. The embodiment considers an example in which indexes of 6 beams are [3, 2, 5, 4, 8, 7] and measurement values are [10, 9, 7, 5, 4, 3].

For example, when the number of beams transmitted by the gNB is 16 and the number, M, of best beams that the UE should report is 6, a measurement result by the UE may be summarized as follows.

TABLE 1

| | |
|---|---|
| Beam 1 with measurement level 1 | |
| Beam 2 with measurement level 9 | $2^{nd}$ ranked measurement |
| Beam 3 with measurement level 10 | $1^{st}$ ranked measurement |
| Beam 4 with measurement level 5 | $4^{th}$ ranked measurement |

TABLE 1-continued

| | |
|---|---|
| Beam 5 with measurement level 7 | $3^{rd}$ ranked measurement |
| Beam 6 with measurement level 1 | |
| Beam 7 with measurement level 3 | $6^{th}$ ranked measurement |
| Beam 8 with measurement level 4 | $5^{th}$ ranked measurement |
| Beam 9 with measurement level 1 | |
| Beam 10 with measurement level - (lower than a predefined detectable threshold level) | |
| Beam 11 with measurement level - (lower than a predefined detectable threshold level) | |
| Beam 12 with measurement level 1 | |
| Beam 13 with measurement level - (lower than a predefined detectable threshold level) | |
| Beam 14 with measurement level - (lower than a predefined detectable threshold level) | |
| Beam 15 with measurement level - (lower than a predefined detectable threshold level) | |
| Beam 16 with measurement level 1 | |

The measurement values for the 16 beams are arranged in descending order from the largest value to the smallest value (refer to Table 2) and the UE selects the 6 best beams (refer to Table 3).

TABLE 2

| Beam indices | [3, | 2, | 5, | 4, | 8, | 7, | 1, | 6, | 9, | ...] |
|---|---|---|---|---|---|---|---|---|---|---|
| Measurement | [10, | 9, | 7, | 5, | 4, | 3, | 1, | 1, | 1, | ...] |

TABLE 3

| Beam indices | [3, | 2, | 5, | 4, | 8, | 7] |
|---|---|---|---|---|---|---|
| Measurement | [10, | 9, | 7, | 5, | 4, | 3] |

To determine the length of an encoded k-th symbol $X_k$, a subset segmentation $S_k$ is defined as indicated in Equation 3.

$$S_k = f(\delta_{k-1}, \theta_{corr})$$ [Equation 3]

where $S_k$ is a subset to which a k-th symbol belongs, representing length during which a k-th symbol is encoded. $S_k$ is determined by a previous measurement value $\delta_{k-1}$ and a correlation parameter $\theta_{corr}$ for the current k-th symbol.

$\delta_{k-1}$ denotes a link quality result of a (k−1)-th beam and $\theta_{cor}$ denotes a correlation coefficient received from the gNB. Since a zeroth symbol is not defined with respect to $S_1$, $\delta_0 = L = 16$, which is a quantization level, may be basically considered. Using Table 3, link quality results are defined as: $\delta_1 = 10$, $\delta_2 = 9$, $\delta_{k-1} = 7$, $\delta_k = 5$, $\delta_{k-1} = 4$, and $\delta_{k-1} = 3$.

Embodiment 1-1

This embodiment is a detailed embodiment for sequential normal reporting to which a correlation coefficient is not applied.

$\delta_1=10, \delta_2=9, \delta_3=7, \delta_4=5, \delta_5=4, \delta_6=3$  $\delta_a=16$ $s_1 = f_{normal}(\delta_0) = \lceil \log_2 16 \rceil = 4$ bits $s_2 = f_{normal}(\delta_1) = \lceil \log_2 10 \rceil = 4$ bits $s_3 = f_{normal}(\delta_2) = \lceil \log_2 9 \rceil = 4$ bits $s_4 = f_{normal}(\delta_3) = \lceil \log_2 7 \rceil = 3$ bits $s_5 = f_{normal}(\delta_4) = \lceil \log_2 5 \rceil = 3$ bits $s_6 = f_{normal}(\delta_5) = \lceil \log_2 4 \rceil = 2$ bits The length of the encoded k-th symbol $X_k$ is defined as $X_k g(s_k(\delta_k, \delta_{k-1}) \in S_k)$.

where g denotes an encoding function determined according to a beam reporting type to be reported by the UE, received from the gNB, and $s_k(\delta_k, \delta_{k-1})$ denotes the number of bits for a downlink quality measurement result of a k-th symbol belonging to a k-th subset.

In the case of the sequential normal reporting, subset segmentation is performed on $\delta_k$ and $\delta_k$ is encoded to have the length of $\lceil \log_2 \delta_{k-1} \rceil$ bits. Then, a result of Table 5 is obtained.

TABLE 5

$\delta_1 = 10, \delta_2 = 9, \delta_3 = 7, \delta_4 = 5, \delta_5 = 4, \delta_6 = 3$  $\delta_0 = 16$
$s_1 = 4, s_2 = 4, s_3 = 4, s_4 = 3, s_5 = 3, s_6 = 2$
$X_1 = g(s_1(\delta_1, \delta_0) \in S_1) = g(\delta_1 \in [4bits]) = g(10 \in [4bits]) = 1010$
$X_2 = g(s_2(\delta_2, \delta_1) \in S_2) = g(\delta_2 \in [4bits]) = g(9 \in [4bits]) = 1001$
$X_3 = g(s_3(\delta_3, \delta_2) \in S_3) = g(\delta_3 \in [4bits]) = g(7 \in [4bits]) = 0111$
$X_4 = g(s_4(\delta_4, \delta_3) \in S_4) = g(\delta_4 \in [3bits]) = g(5 \in [3bits]) = 101$
$X_5 = g(s_5(\delta_5, \delta_4) \in S_5) = g(\delta_5 \in [3bits]) = g(4 \in [3bits]) = 100$
$X_6 = g(s_6(\delta_6, \delta_5) \in S_6) = g(\delta_6 \in [2bits]) = g(3 \in [2bits]) = 11$ In summary, if the UE is configured with the sequential normal reporting to which the correlation coefficient is not applied, a subset caused by $\lceil \log_2 \delta_{k-1} \rceil$ is determined as [4, 4, 4, 3, 3, 2] and the measurement result is transmitted in the form of [1010, 1001, 0111, 101, 100, 11].

FIG. 9 illustrates a simulation result of overhead reduction for sequential normal reporting to which a correlation coefficient is not applied.

Referring to FIG. 9, when reporting on 6 best beams is considered without applying the correlation coefficient, the prior art (bold solid lines) requires a total of 24 bits corresponding to 6 beams*4 bits. However, when Embodiment 1-1 of the present disclosure is applied, 20 bits are required so that overhead of about 17% may be reduced.

Embodiment 1-2

This embodiment is a detailed embodiment for the sequential absolute differential offset reporting to which the correlation coefficient is applied.

Although the reception side may not detect the length of a measurement value transmitted by the transmission side, overhead may further be reduced by applying the correlation coefficient to the sequential absolute differential offset reporting.

An absolute differential offset $\Delta_M$ used for the sequential absolute differential offset reporting indicates the difference between the largest measurement value and the smallest measurement value with reference to Table 3. That is, the absolute differential offset $\Delta_M$ is as indicated by Equation 4.

$$\Delta_M = \Delta_6 = \delta_1 - \delta_6 = 7$$ [Equation 4]

The correlation coefficient is determined as $\theta_{corr} = \max(\Delta_2, \Delta_3, \Delta_4 \ldots \Delta_M)$ by the last M-th $\Delta$ in descending order.

In this case, when k≥2, then $S_k = f_{Abs}(\delta_{k-1}, \theta_{corr}) = f_{Abs}(\delta_{k-1}, \Delta_{last}) = \min(\lceil \log_2(\Delta_M + 1) \rceil, \lceil \log_2 \delta_{k-1} \rceil)$. When k=1, then since $\theta_{corr}$ is inapplicable, subset segmentation is performed on $\lceil \log_2 \delta_0 \rceil$.

Each $S_k$ value for the sequential absolute differential offset reporting to which the correlation coefficient is applied is as indicated by Table 6.

TABLE 6

$\Delta_k = \delta_1 - \delta_k$ for $k \geq 2$, $\Delta_1 = \delta_0$
$\theta_{EDITAbs} = \max(\Delta_2, \Delta_3, \ldots \Delta_M) = \Delta_{Last} = \Delta_M$ for $k \geq 2$
$f_{Abs}(\delta_{k-1}, \theta_{corr}) = f_{Abs}(\delta_{k-1}, \theta_{Last}) = \min([\log_2(\Delta_M + 1)], [\log_2 \delta_{k-1}])$
for $k \geq 2$
$\delta_1 = 10$, $\delta_2 = 9$, $\delta_3 = 7$, $\delta_4 = 5$, $\delta_5 = 4$, $\delta_6 = 3$ $\delta_0 = 16$
$\Delta_2 = \delta_1 - \delta_2 = 1$, $\Delta_3 = \delta_1 - \delta_3 = 3$, $\Delta_4 = \delta_1 - \delta_4 = 5$, $\Delta_5 = \delta_1 - \delta_5 = 6$,
$\Delta_6 = \delta_1 - \delta_6 = 7$
$s_1 = f_{Abs}(\delta_0, \Delta_{Last}) = f_{Abs}(\delta_0) = [\log_2 \delta_0] = 4$ bits
$s_2 = f_{Abs}(\delta_1, \Delta_{Last}) = \min([\log_2(\Delta_6 + 1)], [\log_2 \delta_1]) = \min([\log_2 8], [\log_2 10]) = 3$ bits
$s_3 = f_{Abs}(\delta_2, \Delta_{Last}) = \min([\log_2(\Delta_6 + 1)], [\log_2 \delta_2]) = \min([\log_2 8], [\log_2 9]) = 3$ bits
$s_4 = f_{Abs}(\delta_3, \Delta_{Last}) = \min([\log_2(\Delta_6 + 1)], [\log_2 \delta_3]) = \min([\log_2 8], [\log_2 7]) = 3$ bits
$s_5 = f_{Abs}(\delta_4, \Delta_{Last}) = \min([\log_2(\Delta_6 + 1)], [\log_2 \delta_4]) = \min([\log_2 8], [\log_2 5]) = 3$ bits
$s_6 = f_{Abs}(\delta_5, \Delta_{Last}) = \min([\log_2(\Delta_6 + 1)], [\log_2 \delta_5]) = \min([\log_2 8], [\log_2 4]) = 2$ bits The length of the encoded k-th symbol $X_k$ is defined as $X_k = g(s_k(\delta_k, \delta_{k-1}) \in S_k)$. In the case of the sequential absolute differential offset reporting, values of $\lceil \log_2(\Delta_M+1) \rceil$ and $\lceil \log_2 \delta_{k-1} \rceil$ and are compared. If $\lceil \log_2(\Delta_M+1) \rceil \leq \lceil \log_2 \delta_{k-1} \rceil$ based on whether lengths are equal, an absolute differential offset $\Delta_k$ is encoded and, if $\lceil \log_2(\Delta_M+1) \rceil > \lceil \log_2 \delta_{k-1} \rceil$, a sequential value $\delta_k$ is encoded.

The encoding result is as indicated in Table 7.

TABLE 7

$\delta_1 = 10$, $\delta_2 = 9$, $\delta_3 = 7$, $\delta_4 = 5$, $\delta_5 = 4$, $\delta_6 = 3$, $\delta_0 = 16$,
$s_1 = 4$, $s_2 = 3$, $s_3 = 3$, $s_4 = 3$, $s_5 = 3$, $s_6 = 2$
$\Delta_2 = \delta_1 - \delta_2 = 1$, $\Delta_3 = \delta_1 - \delta_3 = 3$, $\Delta_4 = \delta_1 - \delta_4 = 5$, $\Delta_5 = \delta_1 - \delta_5 = 6$,
$\Delta_6 = \delta_1 - \delta_6 = 7$
$X_1 = g(s_1(\delta_1, \delta_0) \in S_1) = g(\delta_1 \in [4\text{bits}]) = g(10 \in [4\text{bits}]) = 1010$
$X_2 = g(s_2(\delta_2, \delta_1) \in S_2) = g(\Delta_2 \in [3\text{bits}]) = g(1 \in [3\text{bits}]) = 001$
$X_3 = g(s_3(\delta_3, \delta_2) \in S_3) = g(\Delta_3 \in [3\text{bits}]) = g(3 \in [3\text{bits}]) = 011$
$X_4 = g(s_4(\delta_4, \delta_3) \in S_4) = g(\Delta_4 \in [3\text{bits}]) = g(5 \in [3\text{bits}]) = 101$
$X_5 = g(s_5(\delta_5, \delta_4) \in S_5) = g(\Delta_5 \in [3\text{bits}]) = g(6 \in [3\text{bits}]) = 110$
$X_6 = g(s_6(\delta_6, \delta_5) \in S_6) = g(\Delta_6 \in [2\text{bits}]) = g(3 \in [2\text{bits}]) = 11$ In summary, if the UE is configured with the sequential absolute differential offset reporting to which the correlation coefficient is applied, a subset caused by $\min(\lceil \log_2(\Delta_6+1) \rceil, \lceil \log_2 \delta_{k-1} \rceil)$ is determined as [4, 3, 3, 3, 3, 2] and the measurement result is transmitted in the form of [1010, 001, 011, 101, 110, 11].

In this case, absolute differential values [10, 1, 3, 5, 6, 7] are applied to sequential values [10, 1, 3, 5, 6, 3]. The reason why $\delta_6=3$ is directly encoded in encoding δ6 instead of $\Delta_6=7$ is that $\delta_6=3$ is directly encoded as 2 bits due to sequential characteristics.

The UE adds $\Delta_M$ to Corr indicating correlation and transmits $\Delta_M$ and Corr to the gNB.

Figure 10:
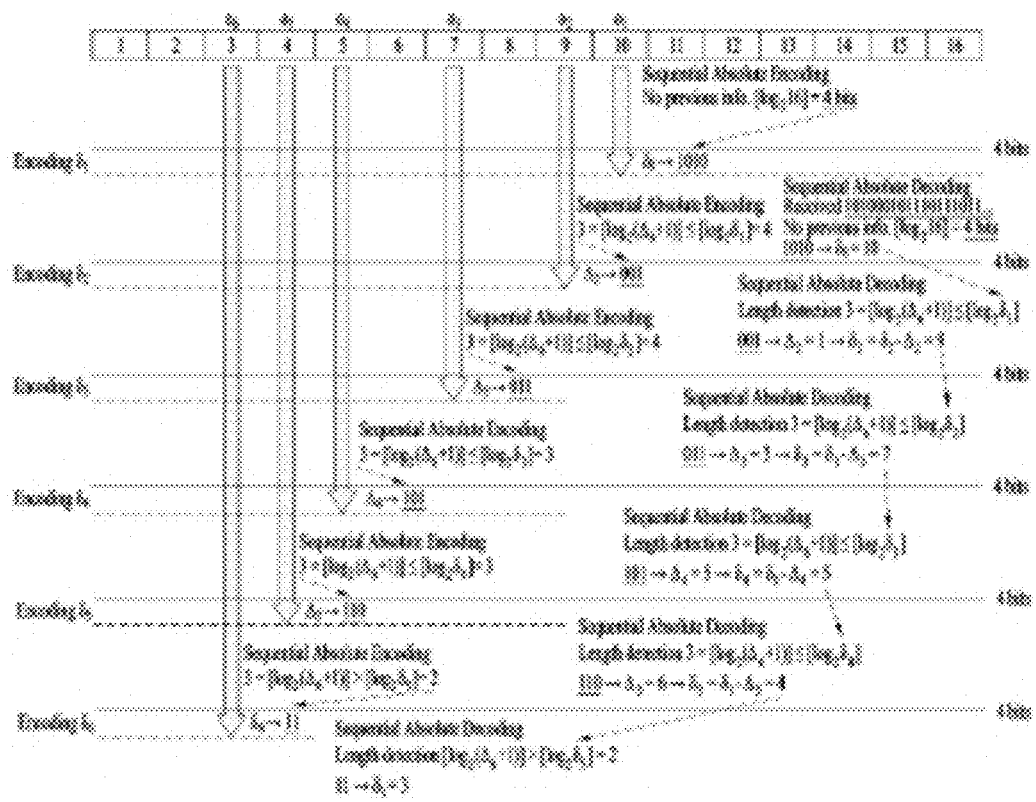
FIG. 10 illustrates a simulation result of overhead reduction for sequential absolute differential offset reporting to which a correlation coefficient is not applied.

FIG. 10 illustrates a simulation result of overhead reduction for sequential absolute differential offset reporting to which a correlation coefficient is not applied.

Referring to FIG. 10, when reporting on 6 best beams to which the correlation coefficient $\Delta_M = \Delta_6 = \delta_1 - \delta_6 = 7$ is applied, the prior art (bold solid lines) requires a total of 24 bits corresponding to 6 beams*4 bits. However, when Embodiment 1-2 of the present disclosure is applied, 18 bits are required so that overhead of about 25% may be reduced.

Embodiment 1-3

This embodiment is a detailed embodiment for the sequential relative differential offset reporting to which the correlation coefficient is applied.

Although the reception side may not detect the length of a measurement value transmitted by the transmission side, overhead may further be reduced by applying the correlation coefficient to the sequential relative differential offset reporting.

A relative differential offset $\Delta_{max}$ used for the sequential absolute differential offset reporting indicates the largest relative difference with reference to Table 3. That is, the relative differential offset $\Delta_{max}$ is as indicated by Equation 5.

$$\Delta_{max} = \max(\Delta_2, \ldots, \Delta_6) = 6 \quad \text{[Equation 5]}$$

The correlation coefficient is determined as $\theta_{corr} = \max(\Delta_2, \Delta_3, \Delta_4 \ldots \Delta_M)$ by the last M-th $\Delta$ in descending order.

In this case, when $k \geq 2$, then $S_k = f_{Rel}(\delta_{k-1}, \theta_{corr}) = f_{Rel}(\delta_{k-1}, \Delta_{max}) = \min(\lceil \log_2(\Delta_{max}+1) \rceil, \lceil \log_2 \delta_{k-1} \rceil)$ When $k=1$, then since $\theta_{corr}$ is inapplicable, subset segmentation is performed on $\lceil \log_2 \delta_0 \rceil$.

Each $S_k$ value for the sequential relative differential offset reporting to which the correlation coefficient is applied is as indicated by Table 8.

TABLE 8

$\Delta_k = \delta_{k-1} - \delta_k$ for $k \geq 2$, $\Delta_1 = \delta_0$
$\theta_{corrRel} = \max(\Delta_2, \Delta_3, \ldots \Delta_M) = \Delta_{max}$ for $k \geq 2$
$f_{Rel}(\delta_{R-1}, \theta_{cor}) = f_{Rel}(\delta_{R-1}, \theta_{max}) = \min([\log_2(\Delta_{max} + 1)],$
$[\log_2 \delta_{k-1}])$ for $k \geq 2$
$\delta_1 = 10$, $\delta_2 = 9$, $\delta_3 = 7$, $\delta_4 = 5$, $\delta_5 = 4$, $\delta_6 = 3$ $\delta_0 = 16$
$\Delta_2 = \delta_1 - \delta_2 = 1$, $\Delta_3 = \delta_2 - \delta_3 = 2$, $\Delta_4 = \delta_3 - \delta_4 = 2$, $\Delta_5 = \delta_4 - \delta_5 = 1$,
$\Delta_6 = \delta_5 - \delta_6 = 1$
⇒ $\Delta_{max} = \max(\Delta_2, \Delta_3, \Delta_4, \Delta_5, \Delta_6) = \max(1, 2, 2, 1, 1) = 2$
$s_1 = f_{Rel}(\delta_0, \theta_{cor}) = f_{Rel}(\delta_0) = [\log_2 \delta_0] = 4$ bits
$s_2 = f_{Rel}(\delta_1, \theta_{max}) = \min([\log_2(\Delta_{max} + 1)], [\log_2 \delta_1]) =$
$\min([\log_2 3], [\log_2 10]) = 2$ bits
$s_3 = f_{Rel}(\delta_2, \theta_{max}) = \min([\log_2(\Delta_{max} + 1)], [\log_2 \delta_2]) =$
$\min([\log_2 3], [\log_2 9]) = 2$ bits
$s_4 = f_{Rel}(\delta_3, \theta_{max}) = \min([\log_2(\Delta_{max} + 1)], [\log_2 \delta_3]) =$
$\min([\log_2 3], [\log_2 7]) = 2$ bits
$s_5 = f_{Rel}(\delta_4, \theta_{max}) = \min([\log_2(\Delta_{max} + 1)], [\log_2 \delta_4]) =$
$\min([\log_2 3], [\log_2 5]) = 2$ bits
$s_6 = f_{Rel}(\delta_5, \theta_{max}) = \min([\log_2(\Delta_{max} + 1)], [\log_2 \delta_5]) =$
$\min([\log_2 3], [\log_2 4]) = 2$ bits The length of the encoded k-th symbol $X_k$ is defined as $X_k = g(s_k(\delta_k, \delta_{k-1}) \in S_k)$. In the case of the sequential relative differential offset reporting, values of $\lceil \log_2(\Delta_{max}+1) \rceil$ and $\lceil \log_2 \delta_{k-1} \rceil$ and are compared. If $\lceil \log_2(\Delta_{max}+1) \rceil \leq \lceil \log_2 \delta_{k-1} \rceil$ based on whether lengths are equal, a relative differential offset $\Delta_k$ is encoded and, if $\lceil \log_2(\Delta_{max}+1) \rceil > \lceil \log_2 \delta_{k-1} \rceil$, a sequential value $\delta_k$ is encoded.

The encoding result is as indicated in Table 9.

TABLE 9

$\delta_1 = 10$, $\delta_2 = 9$, $\delta_3 = 7$, $\delta_4 = 5$, $\delta_5 = 4$, $\delta_6 = 3$, $\delta_0 = 16$
$\Delta_2 = \delta_1 - \delta_2 = 1$, $\Delta_3 = \delta_2 - \delta_3 = 2$, $\Delta_4 = \delta_3 - \delta_4 = 2$, $\Delta_5 = \delta_4 - \delta_5 = 1$
$\Delta_6 = \delta_5 - \delta_6 = 1$
$s_1 = 4$, $s_2 = 42$ $s_3 = 2$, $s_4 = 2$, $s_5 = 2$, $s_6 = 2$
$X_1 = g(s_1(\delta_1, \delta_0) \in S_1) = g(\delta_1 \in [4\text{bits}]) = g(10 \in [4\text{bits}]) = 1010$
$X_2 = g(s_2(\delta_2, \delta_1) \in S_2) = g(\Delta_2 \in [2\text{bits}]) = g(1 \in [2\text{bits}]) = 01$
$X_3 = g(s_3(\delta_3, \delta_2) \in S_3) = g(\Delta_3 \in [2\text{bits}]) = g(2 \in [2\text{bits}]) = 10$
$X_4 = g(s_4(\delta_4, \delta_3) \in S_4) = g(\Delta_4 \in [2\text{bits}]) = g(2 \in [2\text{bits}]) = 10$
$X_5 = g(s_5(\delta_5, \delta_4) \in S_5) = g(\Delta_5 \in [2\text{bits}]) = g(1 \in [2\text{bits}]) = 01$
$X_6 = g(s_6(\delta_6, \delta_5) \in S_6) = g(\Delta_6 \in [2\text{bits}]) = g(1 \in [2\text{bits}]) = 01$ In summary, if the UE is configured with the sequential relative differential offset reporting to which the correlation coefficient is applied, a subset caused by min($\lceil \log_2(\Delta_{max}+1) \rceil$, $\lceil \log_2 \delta_{k-1} \rceil$) is determined as [4, 2, 2, 2, 2, 2] and the measurement result is transmitted in the form of [1010, 01, 10, 10, 01, 01].

In this case, relative differential values [10, 1, 2, 2, 1, 1] are applied as sequential values [10, 1, 2, 2, 1, 1].

The UE adds $\Delta_{max}\doteq\max(\Delta_2, \ldots, \Delta_6)$ to measurement values and Corr indicating correlation and transmits $\Delta_{max}\doteq\max(\Delta_2, \ldots, \Delta_6)$ to the gNB.

Figure 11:
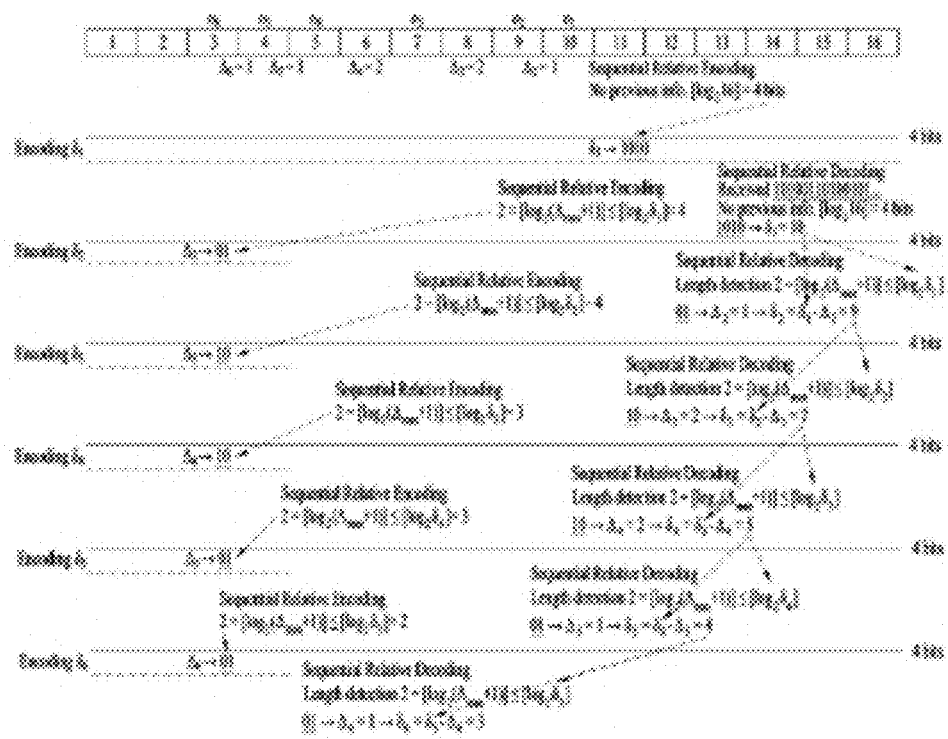
FIG. 11 illustrates a simulation result of overhead reduction for sequential relative differential offset reporting to which a correlation coefficient is not applied.

FIG. 11 illustrates a simulation result of overhead reduction for sequential relative differential offset reporting to which a correlation coefficient is not applied.

Referring to FIG. 11, when reporting on 6 best beams to which the correlation coefficient $\Delta_{max}=\max(\Delta_2, \ldots, \Delta_6)=2$ is applied, the prior art (dotted lines) requires a total of 24 bits corresponding to 6 beams*4 bits. However, when Embodiment 1-3 of the present disclosure is applied, 14 bits are required so that overhead of about 42% may be reduced.

Embodiment 1 described above has mentioned only source coding except for channel coding. After source coding according to the proposed method, a sequential scheme may be considered without an error for the case in which channel coding/decoding is perfectly performed.

Upon receiving encoded information from the UE, the gNB performs decoding as follows.

FIG. 18A illustrates decoding of gNB on encoded information received from UE in the case of Embodiment 1-1 in the present disclosure.

FIG. 18B illustrates decoding of gNB on encoded information received from UE in the case of Embodiment 1-2 in the present disclosure. In this case, reference is made to Corr=$\Delta_6$=7 transmitted by the UE.

FIG. 18C illustrates decoding of gNB on encoded information received from UE in the case of Embodiment 1-3 in the present disclosure. In this case, reference is made to Corr=$\Delta_{max}$=2 transmitted by the UE.

Embodiment 2

This embodiment proposes an encoding method for achieving overhead reduction and a decoding method for decoding signals received from the gNB, by each UE when correlation between UEs is known.

Furthermore, a method to which various encoding techniques are applicable even when a container has a fixed size is proposed.

According to the present disclosure, in an n-bit encoding part on which a source coding stage performs encoding, encoding is performed such that a front predetermined part is used for normal source coding and puncturing of parity bits used for channel coding is applied to the remaining predetermined part. Meanwhile, a decoding stage performs a restoration process using correlation with other UEs. It is proposed that a source encoder use a restoration part using an iterative decoding capability of channel coding, even when there are come errors in the source coding stage, rather than simply performing channel coding.

Figure 12:
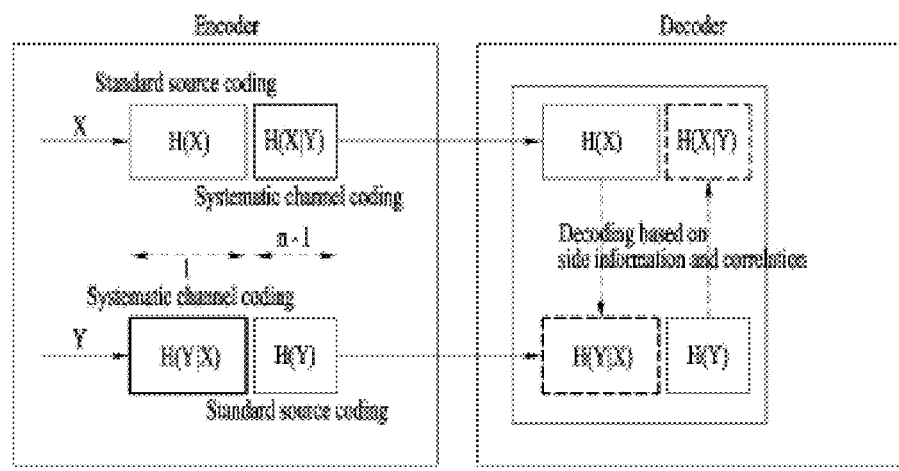
FIG. 12 is a schematic diagram illustrating a conventional separate source coding scheme.

FIG. 12 is a schematic diagram illustrating a conventional separate source coding scheme.

Figure 13:
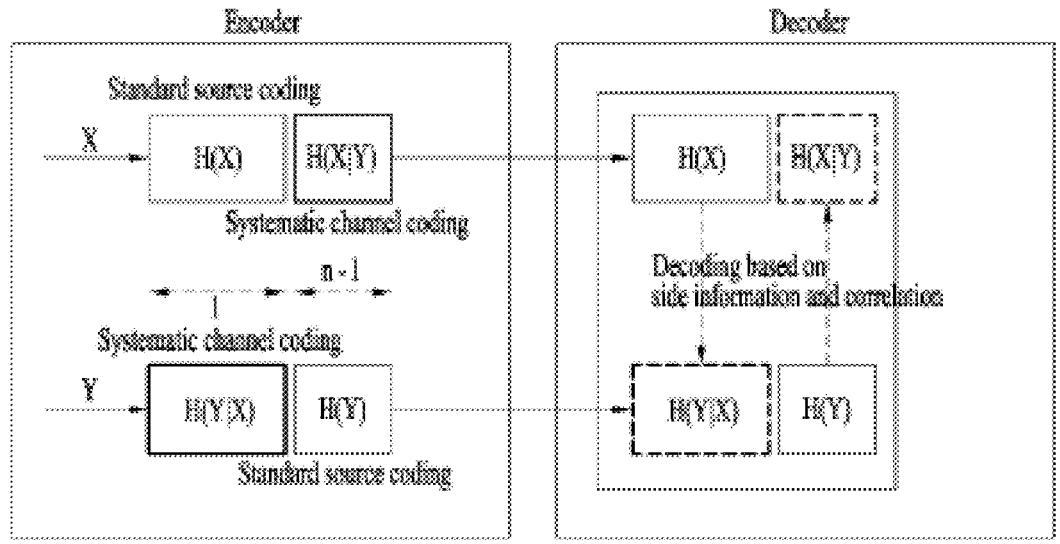
FIG. 13 is a schematic diagram of a separate source coding scheme having a fixed size according to an embodiment proposed in the present disclosure.

In a situation in which correlation between UEs is shared between the gNB and the UEs by measuring similar channel values with respect to a plurality of contiguous UEs, overhead may be reduced using the correlation. FIG. 12 illustrates the conventional separate source coding scheme. As illustrated in FIG. 13, conditional entropy H(X|Y) is transmitted and a decoder performs restoration using side information so that overhead may be reduced. However, since such a method considers conditional entropy encoding of various sizes, this coding method has difficulty in being applied to a mobile communication system considering a fixed container size.

Figure 14:
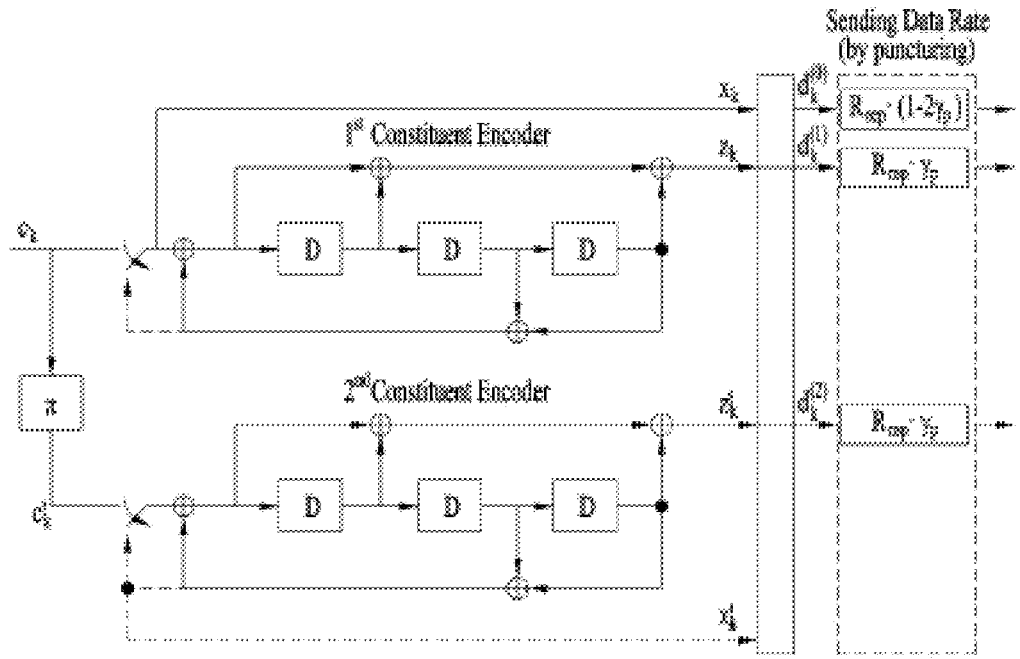
FIG. 14 is a diagram illustrating an exemplary encoder to which a turbo code is applied.
Figure 15:
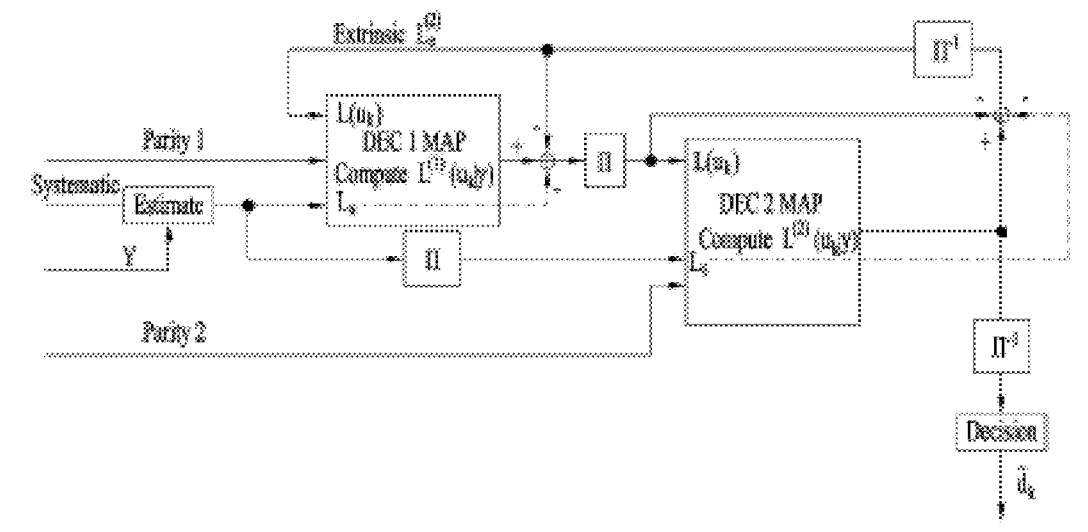
FIG. 15 is a diagram illustrating an exemplary decoder to which a turbo code is applied.

FIG. 13 is a schematic diagram of a separate source coding scheme having a fixed size according to an embodiment proposed in the present disclosure, FIG. 14 is a diagram illustrating an exemplary encoder to which a turbo code is applied, and FIG. 15 is a diagram illustrating an exemplary decoder to which a turbo code is applied.

As illustrated in FIG. 13, the present disclosure proposes a method in which UEs X and Y separate n bits of a fixed container size into a portion for standard source coding and a portion for transmitting conditional entropy to perform systematic channel coding.

A decoder of the gNB decodes the conditional entropy portion transmitted by each UE with reference to correlation using a known part transmitted through standard source coding as side information. As illustrated in FIG. 13, standard source coding and systematic channel coding are performed according to a prescribed portion determined in an encoder. In order to encode the conditional entropy portion to a predetermined length (e.g., n−1 bits for UE X and 1 bit for UE Y), coding rate is adjusted using puncturing. For example, the encoder for encoding the conditional entropy portion using turbo coding is as illustrated in FIG. 14. To satisfy $R_{req}$, a puncturing ratio $\gamma_p$ between a systematic portion and a parity portion is flexibly adjusted.

Table 10 shows a puncturing pattern for allocating 1-2 $\gamma_p$ to systematic bits and $\gamma_p$ to parity bits in order to satisfy a given puncturing ratio $0 < R_{req} < 1$.

TABLE 13

| | $R_{eq} = \frac{2}{3}$ | $R_{eq} = \frac{1}{2}$ | $R_{eq} = \frac{2}{5}$ |
|---|---|---|---|
| $\gamma_p = 0$ | $P_{11} = \begin{bmatrix} 1 & 1 & 0 \\ 0 & 0 & 0 \\ 0 & 0 & 0 \end{bmatrix}$ | $P_{21} = \begin{bmatrix} 1 & 1 & 0 & 0 \\ 0 & 0 & 0 & 0 \\ 0 & 0 & 0 & 0 \end{bmatrix}$ | $P_{31} = \begin{bmatrix} 1 & 1 & 0 & 0 & 0 \\ 0 & 0 & 0 & 0 & 0 \\ 0 & 0 & 0 & 0 & 0 \end{bmatrix}$ |
| $\gamma_p = \frac{1}{4}$ | $P_{12} = \begin{bmatrix} 1 & 0 & 0 & 1 & 0 & 0 \\ 0 & 1 & 0 & 0 & 0 & 0 \\ 0 & 0 & 0 & 0 & 1 & 0 \end{bmatrix}$ | $P_{22} = \begin{bmatrix} 1 & 0 & 0 & 0 & 1 & 0 & 0 & 0 \\ 0 & 1 & 0 & 0 & 0 & 0 & 0 & 0 \\ 0 & 0 & 0 & 0 & 0 & 1 & 0 & 0 \end{bmatrix}$ | $P_{32} = \begin{bmatrix} 1 & 0 & 0 & 0 & 0 & 1 & 0 & 0 & 0 & 0 \\ 0 & 1 & 0 & 0 & 0 & 0 & 0 & 0 & 0 & 0 \\ 0 & 0 & 0 & 0 & 0 & 0 & 1 & 0 & 0 & 0 \end{bmatrix}$ |

TABLE 13-continued $$\gamma_P = \frac{1}{2} \quad P_{13} = \begin{bmatrix} 0 & 0 & 0 & 0 & 0 & 0 \\ 1 & 1 & 0 & 0 & 0 & 0 \\ 0 & 0 & 0 & 1 & 1 & 0 \end{bmatrix} \quad P_{23} = \begin{bmatrix} 0 & 0 & 0 & 0 & 0 & 0 & 0 & 0 \\ 1 & 1 & 0 & 0 & 0 & 0 & 0 & 0 \\ 0 & 0 & 0 & 0 & 1 & 1 & 0 & 0 \end{bmatrix} \quad P_{33} = \begin{bmatrix} 0 & 0 & 0 & 0 & 0 & 0 & 0 & 0 & 0 & 0 \\ 1 & 1 & 0 & 0 & 0 & 0 & 0 & 0 & 0 & 0 \\ 0 & 0 & 0 & 0 & 0 & 1 & 1 & 0 & 0 & 0 \end{bmatrix}$$

All punctured systematic bits are restored through side information of another UE by a decoding stage and the puncturing pattern is commonly known to the UEs and the gNB.

A decoder for restoring the punctured systematic bits is implemented as illustrated in FIG. 15 and a portion punctured by the encoder is restored using the side information received from another UE and correlation statistics. In FIG. 15, an iterative decoding scheme caused by maximum a posteriori (MAP) in a turbo decoding algorithm is used. The punctured portion is restored in consideration of side information Y and correlation statistics.

Figure 16:
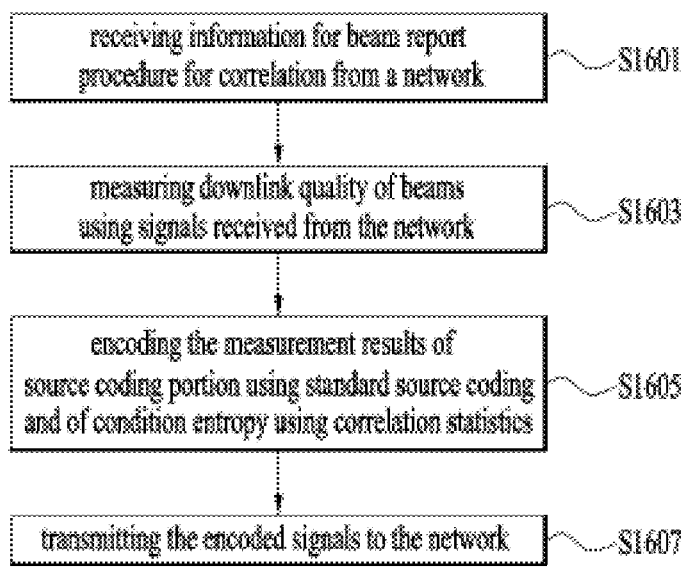
FIG. 16 is a flowchart illustrating a beam reporting procedure by a UE using correlation statistics in a wireless communication system according to another embodiment of the present disclosure.

FIG. 16 is a flowchart illustrating a beam reporting procedure by a UE using correlation statistics in a wireless communication system according to another embodiment of the present disclosure.

While an example of two UEs is described in this embodiment, the embodiment may be extensively interpreted in the same manner even with respect to multiple UEs exceeding the two UEs.

The beam reporting procedure proposed in the present disclosure is triggered by receiving information for the sequential beam reporting procedure from the gNB (S1601).

Desirably, information for the beam reporting procedure using the correlation statistics may be signaled by the gNB through SIB information or a dedicated signal.

Desirably, the information for the beam reporting procedure using the correlation statistics includes the following information.

$C_{orr\_p}$: Correlation statistics (e.g., p_12% correlation and correlation coefficient c_12)

UE_ID: UE IDs of UEs for which encoding for correlation is considered. For two UEs, the UEs are directly indicated as IDs through dedicated signaling or are indicated as a group ID.

Length=(n, lx)

n: Total container length of n bits lx: Standard source coding length of $UE_x$

Gamma_p=Puncturing ratio of parity bits

Upon receiving correlation information Corr_p from the gNB, the UE first checks UE_ID and, if the ID thereof is included in UE_ID, the UE measures a signal received from the gNB in order to perform the beam reporting procedure using the correlation statistics (S1603).

In this case, a measurement value may consider one of values of RSRP, RSRQ, CQI, etc., defined in a general channel quality reporting procedure.

Parameters for configuring the encoder are configured to be the same as the front part of FIG. 13, using Corr_p, UE_ID, Length (n, lx), and Gamma_p received by the UE from the gNB.

The following definition may be used based on a UE having the smallest value among IDs of UEs.

| UE X (smaller value ID) | UE Y (larger value ID) |
|---|---|
| Source coding portion X: lx, bits | Source coding position Y: n-lx bits |
| Sytematic channel coding portion X: n-lx\|bits | Systematic channel coding portion Y: lx bits |

An individual UE performs standard source coding thereof through a source encoder and performs channel coding on a conditional entropy portion by applying a puncturing pattern of Gamma_p in consideration of correlation statistics (S1605). Thereafter, the UE transmits n encoded bits to the gNB (S1607).

Upon receiving the n encoded bits from the UE, the gNB configures decoding to be the same as the rear part of FIG. 13.

With respect to n bits received from each UE, the gNB decodes front lx bits using standard source coding for UE X and decodes rear n-lx bits using standard source coding for UE Y. The gNB decodes rear n-lx bits received from UE X with reference to side information Y decoded from source coding of UE Y and correlation statistics and decodes the front lx bits received from UE Y with reference to side information X decoded from source coding of UE X and correlation statistics. As a result, n-bit decoding of UEs X and Y may be performed so that successful measurement reporting values may be obtained from the respective UEs.

Figure 17:
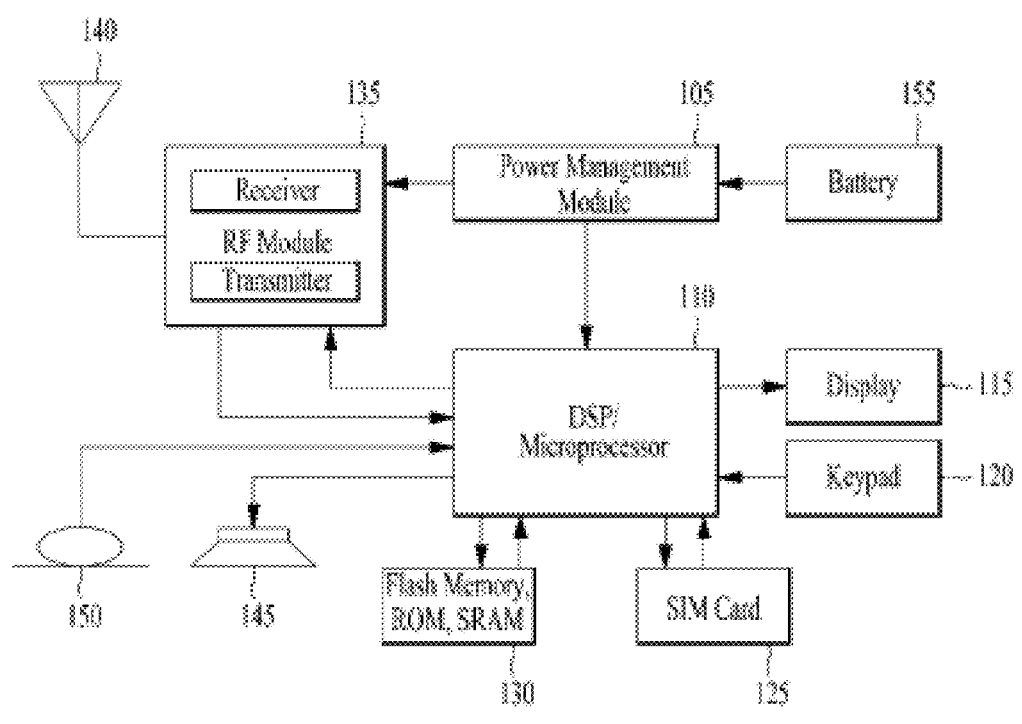
FIG. 17 is a block diagram of a communication device according to an embodiment of the present disclosure.

FIG. 17 is a block diagram of a communication device according to an embodiment of the present disclosure.

Although the device illustrated in FIG. 17 may be a UE and/or an eNB, adapted to perform the above-described mechanism, the device may also be an arbitrary device performing the same operation.

As illustrated in FIG. 17, the device may include a digital signal processor (DSP)/microprocessor 110 and a radio frequency (RF) module (transceiver 135). The DSP/microprocessor 110 is electrically connected to the transceiver 135 to control the transceiver 135. The device may further include, according to selection of a designer, a power management module 105, a battery 155, a display 115, a keypad 120, a SIM card 125, a memory device 130, a speaker 145, and an input device 150.

Particularly, FIG. 17 may illustrate a UE including a receiver 135 configured to receive a request message from a network and a transmitter 135 configured to transmit transmission/reception timing information to the network. The receiver and the transmitter may constitute the transceiver 135. The UE may further include the processor 110 connected to the transceiver (receiver and transmitter 135).

In addition, FIG. 17 may illustrate a network including the transmitter 135 configured to transmit a request message to the UE and the receiver 135 configured to receive transmission/reception timing information from the UE. The transmitter and the receiver may constitute the transceiver 135. The network further includes the processor 110 connected to the transmitter and the receiver. The processor 110 may calculate latency based on the transmission/reception timing information.

Those skilled in the art will appreciate that the present disclosure may be embodied in other specific forms than those set forth herein without departing from the spirit and essential characteristics of the present disclosure. Therefore, the scope of the present disclosure should be determined by reasonable interpretation of the appended claims and all changes coming within the equivalency range of the present disclosure are intended to be embraced in the scope of the present disclosure.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

In the embodiments of the present disclosure, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present disclosure may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present disclosure may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present disclosure may be carried out in other specific ways than those set forth herein without departing from the scope of the present disclosure. The above embodiments are therefore to be construed in all aspects as illustrative and not restrictive. The scope of the disclosure should be determined by the appended claims, not by the above description, and all changes coming within the meaning of the appended claims are intended to be embraced therein.

INDUSTRIAL APPLICABILITY

While the above methods have been described focusing on an example applied to 3GPP LTE and NR systems, the methods are applicable to various wireless communication systems as well as the 3GPP LTE and NR systems.

The invention claimed is:

1. A method of performing an operation by a user equipment (UE) in a wireless communication system, the method comprising:
   receiving information for a sequential beam reporting procedure from a base station (BS);
   measuring downlink qualities of multiple beams serviced by the BS using a signal received from the BS;
   encoding downlink quality measurement results of M best beams in descending order among the multiple beams on which downlink quality measurement is performed; and
   performing the sequential beam reporting procedure by transmitting encoded information to the BS,
   wherein a length of an encoded k-th symbol $X_k$ is determined in consideration of downlink quality measurement of a (k−1)-th symbol according to a beam reporting type to be reported by the UE.

2. The method of claim 1, wherein the information for the sequential beam reporting procedure includes the beam reporting type to be reported by the UE, the number, M, of best beams that the UE needs to report, and a correlation coefficient.

3. The method of claim 2, wherein if the beam reporting type to be reported by the UE, included in the information for the sequential beam reporting procedure, is sequential absolute differential offset reporting, the length of the encoded k-th symbol $X_k$ is determined by a downlink quality measurement result of the (k−1)-th symbol and the correlation coefficient, and the correlation coefficient for the sequential absolute differential offset reporting indicates an absolute differential offset $\Delta_M$.

4. The method of claim 2, wherein if the beam reporting type to be reported by the UE, included in the information for the sequential beam reporting procedure, is sequential relative differential offset reporting, the length of the encoded k-th symbol $X_k$ is determined by a downlink quality measurement result of the (k−1)-th symbol and the correlation coefficient, and the correlation coefficient for sequential relative differential offset reporting indicates a relative differential offset $\Delta_{max}$.

5. The method of claim 1, wherein the information for the sequential beam reporting procedure is received through system information or a dedicated control signal.

6. A user equipment (UE) for performing an operation in a wireless communication system, the UE comprising:
   a wireless communication module; and
   a processor operating together with the wireless communication module,
   wherein the processor
   receives information for a sequential beam reporting procedure from a base station (BS),
   measures downlink qualities of multiple beams serviced by the BS using a signal received from the BS,
   encodes downlink quality measurement results of M best beams in descending order among the multiple beams on which downlink quality measurement is performed, and performs the sequential beam reporting procedure by transmitting encoded information to the BS, and wherein a length of an encoded k-th symbol $X_k$ is determined in consideration of downlink quality measurement of a (k−1)-th symbol according to a beam reporting type to be reported by the UE.

7. The UE of claim 6, wherein the information for the sequential beam reporting procedure includes the beam reporting type to be reported by the UE, the number, M, of best beams that the UE needs to report, and a correlation coefficient.

8. The method of claim 7, wherein if the beam reporting type to be reported by the UE, included in the information for the sequential beam reporting procedure, is sequential absolute differential offset reporting, the length of the encoded k-th symbol $X_k$ is determined by a downlink quality measurement result of the (k−1)-th symbol and the correlation coefficient, and the correlation coefficient for the sequential absolute differential offset reporting indicates an absolute differential offset $\Delta_M$.

9. The UE of claim 7, wherein if the beam reporting type to be reported by the UE, included in the information for the sequential beam reporting procedure, is sequential relative differential offset reporting, the length of the encoded k-th symbol $X_k$ is determined by a downlink quality measurement result of the (k−1)-th symbol and the correlation coefficient, and the correlation coefficient for sequential relative differential offset reporting indicates a relative differential offset $\Delta_{max}$.

10. The UE of claim 6, wherein the information for the sequential beam reporting procedure is received through system information or a dedicated control signal.

* * * * *